United States Patent
Hunkeler

[15] 3,653,290
[45] Apr. 4, 1972

[54] GEAR GENERATING METHOD AND APPARATUS

[72] Inventor: Ernst J. Hunkeler, Fairport, N.Y.
[73] Assignee: The Gleason Works, Rochester, N.Y.
[22] Filed: June 29, 1970
[21] Appl. No.: 52,219

[52] U.S. Cl. .................................................. 90/5, 90/3
[51] Int. Cl. ................................................. B23f 9/10
[58] Field of Search .............................. 90/5, 3, 9.4, 1

[56] References Cited

UNITED STATES PATENTS 2,426,774  9/1947  Jury .............................................. 90/5
3,288,031  11/1966  Krastel et al. ............................... 90/5

Primary Examiner—Gil Weidenfeld
Attorney—Morton A. Polster

[57] ABSTRACT

An improvement in gear cutting methods and apparatus of the type in which a multiple-tooth gear is manufactured from a blank by the generation of successive tooth slots by a cutter which makes a plurality of cuts during the generation of each successive slot. The improvement comprises an alteration in the timed relationship between the cutting rate and the generating roll during successive tooth slot cutting operations such that the number of cuts made by the cutter differs from slot to slot. While the effective contours of successive tooth slots generated by this improved method and apparatus are substantially identical, their cutting patterns differ, resulting in substantial reduction in the noise produced by power transmission systems utilizing gears generated in this manner.

12 Claims, 6 Drawing Figures

PATENTED APR 4 1972 3,653,290

ERNST J. HUNKELER
INVENTOR.

BY Morton Polster

ERNST J. HUNKELER
INVENTOR.

BY Morton A. Polster

GEAR GENERATING METHOD AND APPARATUS

This invention relates to improvements in well known methods and apparatus for the cutting of gears by generation and, more particularly, relates to the production of gears for use in power transmission systems to achieve a reduction in objectionable noise produced by such transmissions.

Objectionable noise from gear trains has long been a problem in the manufacture of power transmission systems, particularly with such systems as used in automobile transmissions. As is well known in this art, even exceptionally smooth gear tooth action results in audible vibrations directly related to the number of teeth on the mating gears in the train, the objectionable frequencies generally being those equivalent to the number of teeth meshing per second, as well as harmonics of these basic frequencies.

It is also well known that some objectionable peaks of gear noise are directly related to the "flat" patterns which result from the cutting operation. That is, the curved contours of gear teeth, while appearing relatively smooth to the unaided eye, are actually formed by a plurality of very narrow flat areas of varying width, each such flat area corresponding to the passage of a single cutter blade through the tooth slot during generation. Since these cutting patterns are substantially identical on each successive tooth of gears cut by prior art methods, the noise generated by the sliding contact of such gears when run in mesh is repetitive and results in undesirable noise peaks at particular frequencies.

The cutting-pattern noise just referred to above is further aggravated by any misalignment or eccentricity of the cutter blades. While such inaccuracies may be so very slight that gears produced by such cutters fall well within allowable dimensional tolerances, they still cause unusual variations in the amount of metal each successive blade removes from a tooth slot during generation and often result in unusually wide "flats" on the surface of the teeth. Since these unusual cutting patterns are substantially identical on each tooth of a gear cut by a slightly misaligned or eccentric cutter, they often result in unacceptable noise levels. According to present cutting methods, the first set of gears cut on a machine following its set-up by the operator (or following replacement of the cutter head) is generally tested to check for any such cutter inaccuracies which might cause cutting patterns which are unusual and result in unacceptable noise in a gear train. In such events, the cutters must be "re-trued" on the machine and/or machine adjustments are made by the operator to correct or compensate for such inaccuracies. Such special cutter and machine adjustments are extremely costly in time, particularly on mass production machinery in which a plurality of cutting machines are interconnected by automatic workpiece loading and transfer mechanisms.

The invention herein provides method and apparatus whereby cutting-pattern noise can be substantially reduced, and this important improvement reduces normal cutting-pattern noise peaks as well as those resulting from cutter inaccuracies. That is, by virtue of the novel method and apparatus disclosed herein, the minute variations in the pattern of "flats" which occur in the surface of gear teeth manufactured on gear cutting machines will no longer result in the production of undesirable peaks of unusual frequencies.

In essence, the subject invention prevents such tooth surface patterns from occuring in a repetitive manner on successive teeth cut on the same machine. This remarkable and important result is produced in an extremely simple manner, namely, by varying the timed relationship between the cutting rate at which the cutter moves relative to the speed of the generating roll during generation of successive tooth slots. It will be appreciated by those skilled in this art that the number of tiny flat areas which comprise the surface of any particular gear tooth is in direct relation to the number of revolutions the cutter head makes relative to the workpiece blank during each generating roll. Therefore, according to the subject invention, by changing the timed relationship between the rate at which the cutter turns and the speed of the generating roll for each successive tooth slot, different numbers of cuts occur during the generation of each such successive tooth in the gear. In this way, cutting patterns which heretofore appeared at the same relative position on each successive tooth (by virtue of the repetitive generating cycle and the constant relationship between cutter rate and generating roll) now are positioned in a random manner from tooth to tooth. This random positioning of the cutting "flats" prevents the production of undesirable peak noise frequencies when these gears are used in power transmissions.

It will be especially appreciated by those in the art that the method and apparatus disclosed herein will provide important savings on mass production machinery because even in the event of any slight cutter blade eccentricity or misalignment which, as noted above, results in unusual variations in the width of the flat areas forming the contour of a gear tooth, such variations will not appear at the same place on successive gear teeth due to the alteration of the timed cutting relationship. This means that cutters trued off the machine to predetermined tolerances can be mounted on a gear machine without requiring an operator to further adjust the machine or cutter thereafter in order to avoid objectionable cutter-pattern noise peaks, thereby providing a substantial saving in the cost of mass producing transmission gears.

According to a further feature of the invention herein, alternation of the timed relationship between cutting rate and generating roll for the cutting of successive tooth slots does not change the speed at which machine operations occur during the remaining portions of the repetitive cutting cycle. That is, cutter withdrawal, indexing of the work blank, and infeed of the cutter for engagement with the blank to generate the next successive slot, are all carried out at optimum machine speeds, the novel relative variations in cutter speed taking place only during the cutting portion of the repetitive cycle.

While it will be appreciated that the method and apparatus disclosed herein are adaptable to other gear generating systems, the invention will be described as applied to a spiral bevel gear generating machine using a face mill cutter.

The foregoing and other objects and advantages of the invention will be apparent from the following description and the accompanying drawings in which.

Figure 2:
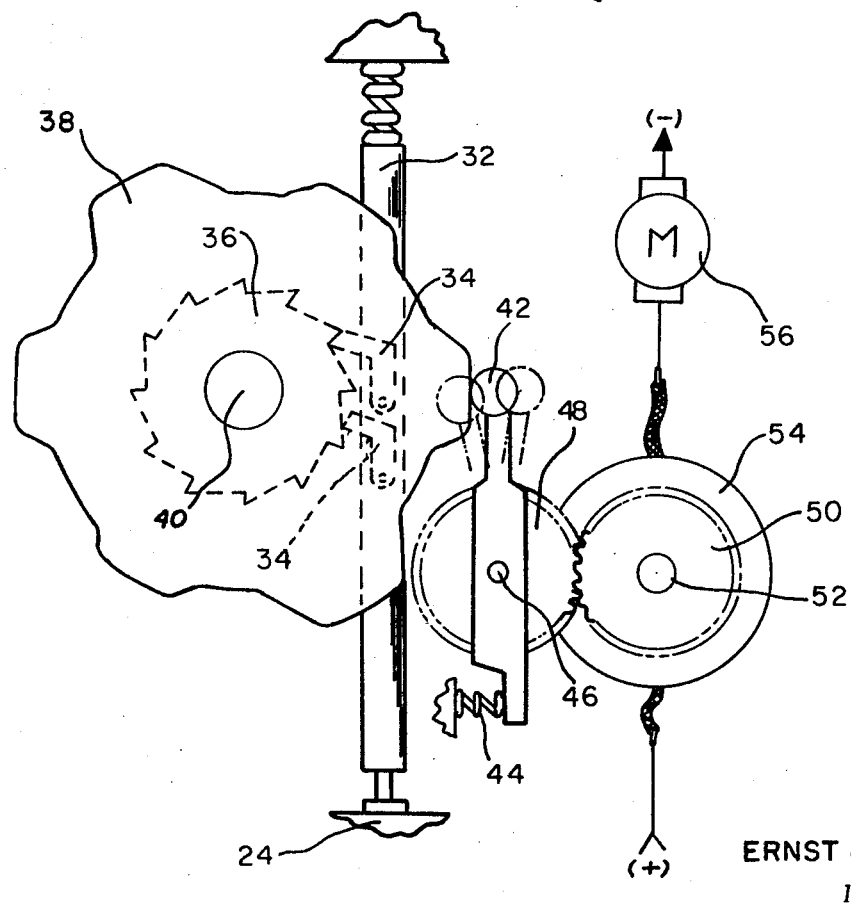
FIG. 2 is a partially schematic diagram of a preferred form of stepping mechanism and cam control for varying the timed relationship between cutting rate and generating roll on a machine such as that generally illustrated in FIG. 1.
Figure 5:
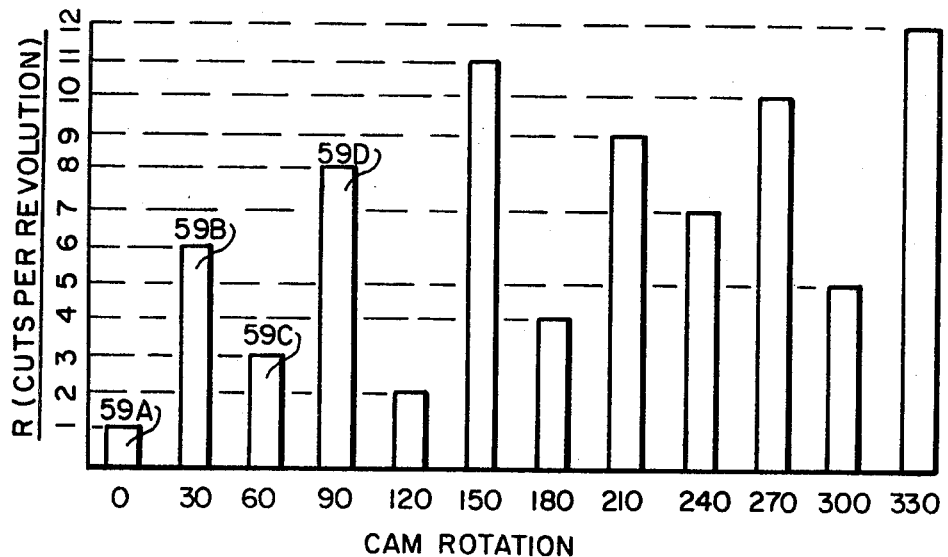
Figure 6:
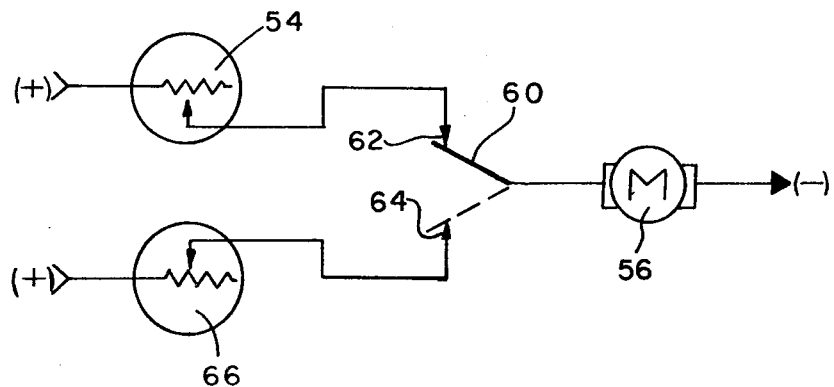

FIG. 5 is a graphic representation of suggested variations in generating roll speed selected for successive tooth-slot generation by the apparatus shown in FIG. 2; and, FIG. 6 is a simplified schematic circuit diagram for altering the speed of the machine's cycle control motor to provide a desired variation in generating roll speed during the cutting portion of a machine cycle while permitting the cycle to operate at a predetermined optimum speed during the remaining portions of the machine cycle.

Figure 1:
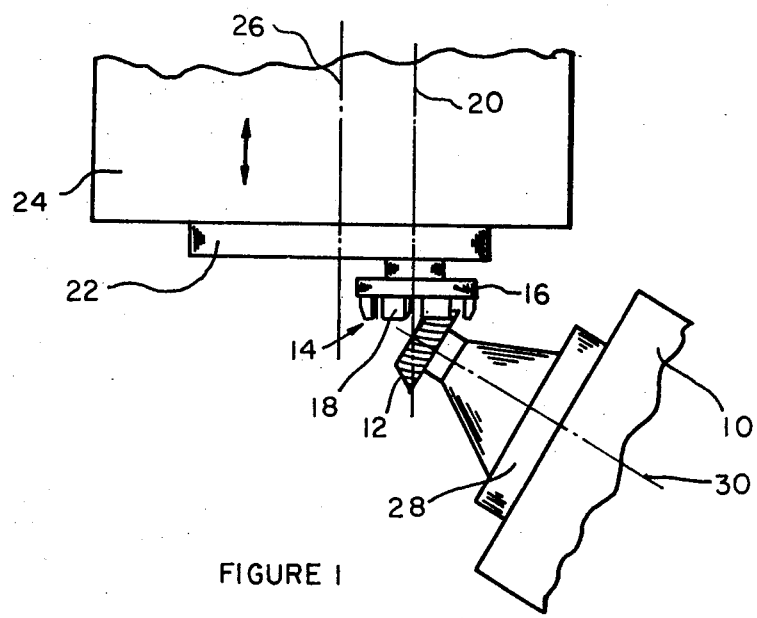
FIG. 1 is a schematic representation of the cutter and work heads of a typical bevel gear generating machine of the type contemplated for improvement by the invention herein.

FIG. 1 illustrates the cutter and work heads of a typical bevel gear generator of the well known type of gear cutting machinery to which the invention herein may be applied.

As is well known in this art, such a machine includes a work head 10 which receives and holds a gear blank 12 in which a plurality of spirally shaped teeth are generated by a face mill cutter 14 comprising a cutter head 16 onto which a plurality of cutter blades 18 are securely fixed.

Cutter 14 is mounted for rotation about axis 20 in a cradle 22 which in turn is mounted in a cutter slide 24 for rotation about axis 26.

As is well known in this art, generation of spiral bevel gear from work blank 12 is accomplished in the following manner:

shown to comprise a plate 68 which is substantially identical to the plate 56 in the tracer probe assembly 16 and which serves substantially the same purpose. Plate 68 is fixed to the lower end of frame member 22 and pivotally connected to a motor frame 70 to permit the frame 70 to be disposed in alignment with member 22 or in either of two angular orientations, as selected by the operator. Suffice it to say that the plate 68 bears the same relation to frame 70 as the plate 56 bears to the extension 50 and that normally both extension 50 and frame 70 are disposed in the same relative orientation.

Frame 70 supports a rotary motor 72 which is energizable to rotate a cutter 74 depending therefrom. The rotating cutter 74 removes material from the block of pattern stock as it is displaced by the operator, synchronism with the model being obtained by the rigid frame 10.

Considering now the overhead support means 12 in greater detail, reference will be made to FIGS. 1, 5, and 6. Assembly 12 includes a horizontally disposed longitudinally extending channel 80 having longitudinally spaced trolleys 82 and 84 affixed thereto. The trolleys 82 and 84 include wheels which are adapted to engage and ride on the lower flange of an I beam 86 which may be part of the building structure within which the apparatus is installed. The trolleys 82 and 84 thus serve to permit the frame 10 to be displaced longitudinally along the I beam 86.

Channel 80 carries at the left end as shown in FIG. 1 a pair of parallel depending brackets 88 which receive a cylindrical member 90 which, in turn, is telescopically engaged within the vertical frame member 20. On the longitudinally opposite end of the channel 80, a second pair of parallel depending brackets 92 receive a cylindrical member 94 which is telescopically engaged with the vertical frame member 22. The brackets 88 and the cylindrical member 90 are provided with horizontally aligned holes which receive a pivot pin 96 to permit the cylindrical member 90 and the frame 10 to pivot about a longitudinal axis relative to the brackets 88. A cotter pin may be used to maintain the pivot pin 96 in place. A similar pivot pin 98 is provided at the opposite longitudinal end of the frame 10 to maintain the short cylindrical telescopic member 94 in engagement with the brackets 92. Accordingly, the entire frame 10 may be pivoted or swung about a longitudinal axis passing through pins 96 and 98.

It is very important that the longitudinally opposite ends of the frame 10 are displaced vertically in unison with one another thereby to maintain the tracer assembly 16 and the cutter assembly 18 at the same vertical level at all times. To provide this unison vertical displacement as well as to counterbalance the mass of the frame 10, a pair of longitudinally spaced chains 100 and 102 are affixed to the upper cross member 24 of the frame 10 and extend upwardly over sprockets 104 and 106. The sprockets are mounted on longitudinally opposite ends of a rod 108 which interconnects the sprockets 104 and 106 for unison rotation. Rod 108 passes through suitable bearings to permit the sprockets 104 and 106 and the rod 108 to rotate freely.

Figure 4:
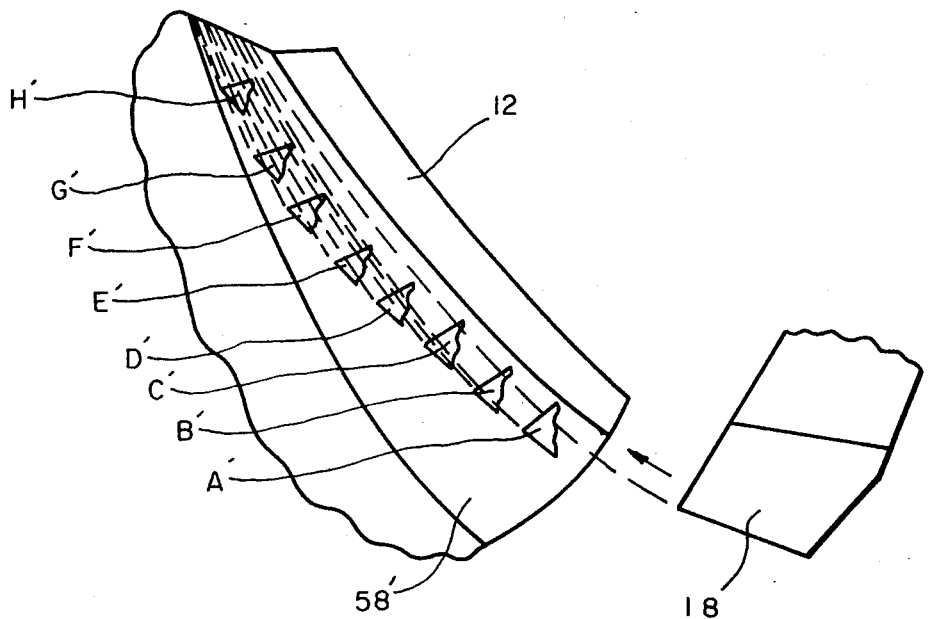

Chains 100 and 102 are carried horizontally and transversly back to idler assemblies from which the chains drop vertically to a counterweight 118. The idler assembly for chain 100 is shown in FIG. 4 to include a support arm 110 carried by channel 80 and a second sprocket 112. The idler assembly for chain 102 is identical. The counterweight 118 is preferably selected to equal the total suspended mass of the frame 10 so that in the absence of an input force applied to the frame 10 by an operator, both the frame 10 and the counterweight 118 tend to remain in whatever vertical position is previously established by the operator. Since the sprockets 104 and 106 must rotate in unison due to the interconnecting rod 108, and chains 100 and 102 cannot slip on the sprockets, vertical displacement of the frame 10 is rectilinear in nature, thus, preserving the vertical elevational equality as between the tracer assembly 16 and the cutter assembly 18.

Figure 3:
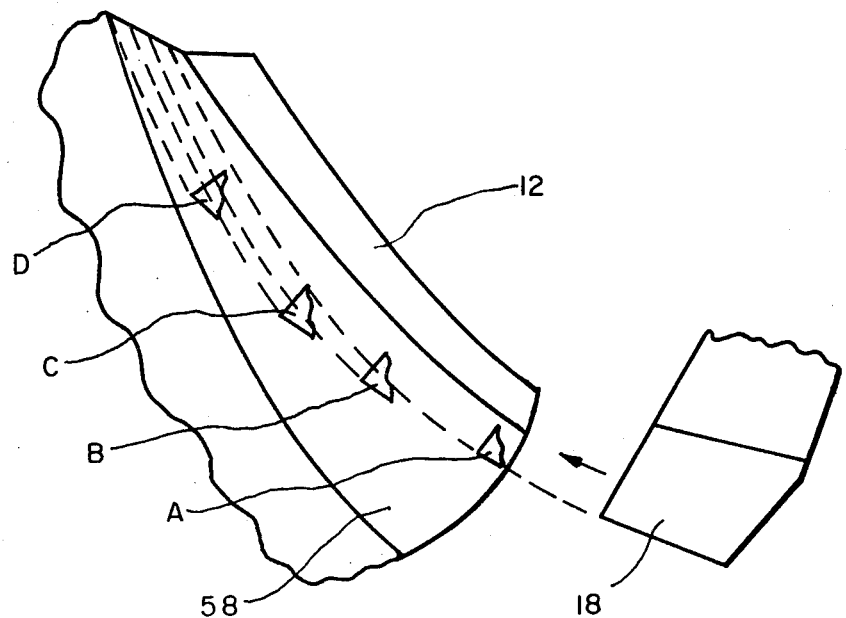
FIGS. 3 and 4 are schematic illustrations of the generation of successive tooth slots in a work blank, showing the relatively different cutting patterns effected by the invention herein.

Considering the platform 14 in greater detail, this assembly is shown in FIG. 3 to be fabricated from a substantially rigid and level plywood deck 120 which is rectangular in overall configuration. Deck 120 is mounted on a quadrangular frame 122 which elevates the deck 120 by approximately 10 inches. Care is taken to ensure that the surface of deck 120 is level such that the vertical distance between the deck and the probe 46 is equal to the vertical distance between the platform and the cutter blade 74. Blade 74 may be somewhat higher than probe 46 to leave extra stock on the model. A centerline 124 is drawn on the deck 120, this centerline representing the longitudinal displacement path of the probe assembly 16 and cutter assembly 18 when the frame 10 is vertically oriented. Care is taken to align the centerline of the model and the pattern stock with the centerline 124 when these elements are placed on the deck 120. The alignment between the tracer probe assembly and the platform centerline 124 may be quickly and easily checked by removing the tracer probe head 46 from the cylindrical extension 50 and placing a lead pencil or other suitable marking device in its place, lowering the frame 10 until the pencil engages the deck 120 of the platform 14 and then longitudinally displacing the frame 10 to determine whether the newly marked centerline corresponds with the preestablished centerline 124.

Although the operation of the illustrative embodiment of the invention is believed to be apparent from the foregoing structural description, a brief summary of the operation will now be made.

A hard surface model is placed on the deck 120 of the platform 14, the centerline of the model being aligned with the longitudinal centerline 124 of the deck 120 such that the probe head 46 may be displaced over the surface of the model. The angular orientation between the probe head extension 50 and the vertical member 20 is adjusted to correspond to the nature of the surface to be traced. A block of pattern stock, such as polystyrene foam, is placed on the deck 120 beneath the cutter assembly 18 with the centerline of the block on the centerline 124. At this point, the motor 72 is energized to rotate the cutter tool 74. When an ordinary router motor is used, the rpm is decreased by means of a suitable transformer type power supply such that the cutter tool 74 is rotated at a much lower speed than the ordinary operating speed of a router.

The operator then addresses the frame 10 placing himself in a facing relationship with the A-shaped opening defined by the cross members 42 and 44. The operator places his hands on the members 42 and 44 to direct the frame 10 longitudinally, vertically, and pivotally about the longitudinal axis as necessary. Counterweight 118 permits the frame 10 to be raised and lowered by the application of small forces thereto, the chains 100 and 102 and the sprockets 104 and 106 permitting the free vertical adjustment of the frame 10 as previously described. The rod 108 interconnecting sprockets 104 and 106 ensures a unison vertical displacement of the opposite longitudinal ends of the frame 10, thus to maintain the tracer probe assembly 16 and the cutter assembly 18 on the same horizontal level during vertical displacement of the entire frame 10. Trolleys 82 and 84 permit the frame 10 to be displaced in the longitudinal direction defined by the I-beam 86 and the pivotal connections between the brackets 88 and 92 and the telescopic vertical sections 90 and 94 permit the entire frame 10 to be pivoted about a longitudinal axis thereby to accomplish and afford 3° of freedom in the movement of the frame 10 relative to the model and pattern stock surfaces.

It is to be understood that the invention has been described with reference to an illustrative embodiment and that various modifications thereof will be apparent to those skilled in the art.

The embodiments of the invention in which an exclusive property or privilege is claimed are defined as follows:

1. A pattern duplicator comprising: a rigid, manually displaceable frame including a pair of longitudinally spaced vertical members and means rigidly connecting the members, said frame being adapted for overhead, vertical suspension and having a longitudinal axis, tracer means depending from the When the cradle reaches the end of its generating roll, the timing cam moves switch 60 to the position shown by the dotted line, opening with upper contact 62 and closing with lower contact 64. This thereby changes the control of the speed of motor 56 to the circuit including potentiometer 66 which is set to a predetermined value by the machine operator. The circuit stays in this condition until the machine cycle repeats to the point where another generating roll is ready to begin, at which time switch 60 is closed once again with upper contact 62, and the circuit operation then repeats in the manner just explained above.

In this way, the non-cutting portion of the machine cycle may be controlled for optimum operational speeds while still realizing the advantages of the invention's novel varying rates for the timed relation of the generating roll.

The rather simple invention disclosed above has provided a major advance in gear generation technology by solving a problem which has plagued the industry since gears have been used in power transmission systems. By simple changing the cutting pattern of each successive tooth in a generated gear (without changing the effective contour of the teeth which remain substantially identical throughout the gear), it has been possible to reduce remarkably the amount of undesirable noise generated in transmission by such gears.

While only a single embodiment of the invention herein has been disclosed above, it should be obvious that this has been selected merely to facilitate explanation of the invention and not to limit the form which the invention may take. Many variations, modifications, and alterations of the apparatus disclosed herein may be achieved to carry out the novel method disclosed herein.

What is claimed is:

1. In a method for cutting a multiple-tooth gear from a blank by using a well known repetitive cycle including the steps of:
   a. engaging a cutter with the blank while producing a relative rolling motion therebetween at a predetermined speed to generate a tooth slot in the blank, and
   b. moving the cutter at a predetermined cutting rate in timed relationship to said generating roll so that the cutter makes a plurality of cuts in the blank during each generating roll,
the improvement comprising the further step of:
   c. altering the timed relationship of the cutting rate relative to the speed of the generating roll between at least two successive tooth slot generations so that the number of cuts made by the cutter during the first such generation is different than the number of cuts it makes during the successive generation.

2. The method according to claim 1 wherein the alternation of the timed relationship is made at least once during each successive cycle whereby the number of cuts made by the blade during generation of any tooth slot differs from the number of such cuts made during generation of the preceding slot.

3. The method according to claim 1 wherein at least three individually distinct timed relationships are utilized, respectively, during successive tooth-slot generations.

4. The method according to claim 1 wherein the cutting rate is maintained at a constant value and alternation of the timed relationship is achieved by changing the speed of the generating roll.

5. The method according to claim 3 wherein said individually distinct timed relationships are selected sequentially so that, during four consecutive tooth-slot generations, the number of blade cuts made during generation of the third such successively cut slot is greater than the cuts made during the generation of the first slot and less than the number of cuts during generation of the second slot, the latter being less than the number of cuts made during generation of the fourth successive slot.

6. The method according to claim 4 wherein alteration of timed relation is made just prior to each successive engagement of the cutter and blank, and comprising the further step of:
   f. maintaining a predetermined constant time interval for the non-cutting steps of each repetitive cycle.

7. In a machine for cutting a multiple-tooth gear from a blank, of the type having a repetitive cycle of machine movements for generating each tooth slot, said cycle including a cutting portion in which the blank is engaged with a cutter during a generating roll of predetermined speed, the cutter being driven at a predetermined cutting rate in timed relation to the roll to cut the blank a plurality of times during each generating roll, the improvement comprising;
   variation means responsive to machine movement during a portion of at least one of said repetitive cycles for altering the timed relationship between the cutting rate and the speed of the generating roll to change the number of cuts made by the cutter during the second of two successive generating rolls.

8. A machine according to claim 7 wherein said variation means is responsive to said machine movement during a portion of each repetitive cycle to alter said timed relationship at least once during each cycle, whereby the number of cuts made by the cutter during any generating roll will differ from the number of cuts made during the preceding generating roll.

9. A machine according to claim 8 wherein said variation means includes
   relationship selecting means adjustable to at least three conditions each of which provides a respectively distinct timed relationship between the cutting rate and generating roll, and
   step means responsive to said machine movement at least once during each repetitive cycle for adjusting said selecting means to a different one of said conditions during each cycle, whereby during at least three consecutive generating rolls three different timed relationships will occur.

10. A machine according to claim 7 wherein said cutting rate is maintained at a constant value and said variation means alters said timed relationship by changing the speed of said generating roll.

11. A machine according to claim 9 wherein said relationship selecting means includes a rotatable cam, and said step means includes a pawl and ratchet.

12. A machine according to claim 9 wherein said selecting means is adjustable to at least four distinct conditions, and said step means adjusts the selecting means to a predetermined sequence of timed relationships, each one of said timed relationship being selected for a respective one of at least four consecutive generating rolls so that the number of cuts made during the third such roll is greater than the number of cuts made during the first roll and less than the number of cuts made during the second roll, the latter cuts being less than the number of cuts made during the fourth such consecutive roll.

* * * * *

UNITED STATES PATENT OFFICE
CERTIFICATE OF CORRECTION

Patent No. 3,653,290                Dated April 4, 1972

Inventor(s) Ernst J. Hunkeler

It is certified that error appears in the above-identified patent and that said Letters Patent are hereby corrected as shown below:

Cancel columns 3 and 4 and substitute the following:

-- In its unloaded condition, cutter slide 24, which is slidable axially relative to cutter and cradle axes 20 and 26, is moved away from work head 10 (upward in Fig. 1) to permit a work blank 12 to be loaded and chucked in a spindle 28 rotatably mounted within work head 10. The machine cycle is then initiated, moving slide 24 toward work head 10 until cutter 14 is in position to engage the work blank 12. Cutter 14 is rotated at a predetermined rate about axis 20, and the generating roll is initiated, blank 12 being slowly rotated about axis 30 while cradle 22 slowly rotates within slide 24 about its axis 26. This results in the well known generation of a spiral tooth slot in blank 12. During this generating roll, each blade 18 of cutter 14 makes at least one cut through the particular tooth slot being generated, the number of such cuts being predetermined by the timed relationship between the rate of rotation of cutter 14 and the speed of the generating roll executed by workpiece 12 and cradle 22.

After the generating roll is complete, cutter slide 24 withdraws, and an appropriate indexing mechanism moves blank 12 into proper position to begin the cutting of the next slot. The machine cycle then repeats itself until all of the tooth slots have been successively generated in the blank.

As indicated above, in all prior art gear generating machines the timed relationship between cutting rate and generating roll results in the generation of a particular cutting pattern (i.e., a plurality of flat areas of varying width which comprise the surface contour of each successive tooth slot). And due to the tooth-to-tooth consistency of this timed relationship, the cutting pattern is virtually identical on each of the gear teeth so generated. It is this repetitive cutting pattern which is one of the major sources of gear noise peaks in power transmissions. The invention herein avoids the generation of such identical cutting patterns, thereby obviating the noise problems which results from such repeating cutting patterns. This is accomplished by changing the timed relationship between cutting rate and generating roll.

As is known to those skilled in this art, the cutter on such generating machines may be driven by an AC motor, while the repetitive machine cycle is often controlled by a DC motor. While it can be appreciated that a variation in the timed relationship between cutting rate and generating roll can be achieved by changing the speed of either or both of these motors, according to the preferred embodiment of the invention herein alteration of the timed relationship is achieved by changing the speed of the DC motor during the generating roll.

The selective adjustment of the speed of the DC motor is accomplished by the apparatus disclosed in Fig. 2. The motion of cutter slide 24, as it brings the cutter into position to engage the work blank, moves a spring-biased rod 32 which carries a pawl 34 in an upward direction as shown in Fig. 2. Pawl 34 is biased by a spring (not shown) into constant engagement with ratchet wheel 36 and, upon its upward movement, turns ratchet wheel 36 one step (30° in the embodiment shown). This in turn rotates a cam 38 to which ratchet wheel 36 is mechanically fixed by a common shaft 40.

A cam follower 42 is biased by a spring 44 into constant engagement with the surface of cam 38. Follower 42 pivots about axis 46 to drive gear 48 which is fixed to follower 42 and also rotates about axis 46. Gear 48 in turn drives gear 50 which is fixed to, and positions, a shaft 52 of a potentiometer 54. The angular position of shaft 52, as determined by cam 38 through the drive mechanism just described above, selects various values of resistance for potentiometer 54 in a well known manner. Potentiometer 54 is in series electric circuit with machine cycle control motor 56 so that the resistance of potentiometer 54 determines the relative voltage drop appearing across motor 56 and thereby determines the speed of the latter, as will be understood by those skilled in the art.

Following the generation of each successive tooth slot, cutter slide 24 retracts (downward in Fig. 2), being followed by spring-biased rod 32 which carries pawl 34 to its lower position. After the work blank has been indexed, the repetitive cutting cycle begins once again with the forward movement of cutter slide 24. Pawl 34 then engages ratchet wheel 36 to step cam 38 to its next position, thereby changing the position of follower 42 and the setting of potentiometer 54 to select a different speed for motor 56 and alter the timed relation between cutting speed and generating roll.

Figs. 3 and 4 illustrate in a simplified, graphic manner the effect on tooth-slot cutting patterns of variation in the timed relationship between cutter rate and generating roll. A cutter blade 18 is shown in each illustration in position ready to make a first cutting pass through a work blank 12. The representations referred to by letters A-D and A'-H' indicate, respectively, the relative positions of the same cutter blade on successive cutting passes through the blank in effecting the generation of similar tooth slots 58 and 58". Fig. 3 illustrates a timed relationship in which the speed of the generating roll is relatively fast in comparison to the rate of rotation of the cutter head, while Fig. 4 illustrates a timed relation in which the generating roll is relatively slow relative to the rotation of the cutter. As can be seen, in the latter case, each pass of a cutter blade through the slot cuts out much less metal than does each pass of a cutter blade when the generating roll is relatively faster as shown in Fig. 3. Because different amounts of metal are removed, the position and relative size of the flat areas which comprise the contour of the tooth slot are different in each case.

According to the preferred embodiment of the invention herein, it is contemplated that a plurality of different timed relationships will be used in the cutting of any one particular gear, and Fig. 5 illustrates a possible sequence of twelve different timed relationships which might be selected by movement of cam 38 in response to each one of twelve 30° steps. The units (R) indicated on the ordinate are purely arbitrary and are not intended to indicate any actual resistances, generating roll speeds, or cuts per tooth slot, but only to show differences in the timed relationships and the relative direction of such differences.

In this regard, attention is called to the preferred pattern of the timed relationships suggested in Fig. 5. When cutting successive tooth slots according to this pattern, the motor speeds are varied to prevent any repetitive patterns. That is, the number of cuts per slot do not increase or decrease in any regular manner. For instance, during the first Patent No. 3,653,290 Page 4 four slot generations (using timed relationships illustrated in Fig. 5) the number of cuts 59C made during the third such generation exceeds the number of cuts 59A made during the first but is less than the cuts 59B during the second, while generation of the fourth slot will require more cuts 59D than the second. Of course, it will be understood that any number of different timed relationships can be used. In the preferred forms of the invention, it is not only suggested that the timed relationships be selected such that they do not repeat in a regular manner but, further, that the number of such timed relationships should not be in any exact multiples of the number of teeth on the gear being generated.

Fig. 6 is a simplified schematic diagram of the circuitry used for energizing the cycle control motor 56 according to the invention herein. Basically this circuit comprises: a cam-operated switch 60, having an upper contact 62 and a lower contact 64; potentiometer 54, which controls the speed of the generating roll as described above; and index control potentiometer 66, which is used to control the speed of the machine cycle during the return of the cradle and the indexing of the workpiece.

Prior to the generating roll and just before cutter slide 24 moves the cutter 14 into its position for engagement with the work blank, a timing cam (not shown) moves switch 60 to the full line position illustrated in Fig. 6 so that it closes with upper contact 62. In this position the speed of motor 56 is controlled by the circuit including potentiometer 54, the setting of potentiometer 54 being altered for each generating roll as described in detail above. -- .

Signed and sealed this 20th day of March 1972.

(SEAL)
Attest:

EDWARD M. FLETCHER, JR.
Attesting Officer

ROBERT GOTTSCHALK
Commissioner of Patents